United States Patent
Collard et al.

(10) Patent No.: US 7,122,167 B2
(45) Date of Patent: Oct. 17, 2006

(54) PRECIOUS METAL RECOVERY FROM ORGANICS-PRECIOUS METAL COMPOSITIONS WITH SUPERCRITICAL WATER REACTANT

(75) Inventors: Simon Collard, Cambridge (GB); Anders Gidner, Karlskoga (SE); Brian Harrison, Bedfordshire (GB); Lars Stenmark, Karlskoga (SE)

(73) Assignees: Johnson Matthey Public Limited Company, London (GB); Chematur Engineering AB, Karlskoga (SE)

( * ) Notice: Subject to any disclaimer, the term of this patent is extended or adjusted under 35 U.S.C. 154(b) by 454 days.

(21) Appl. No.: 10/258,952

(22) PCT Filed: Apr. 10, 2001

(86) PCT No.: PCT/GB01/01601

§ 371 (c)(1),
(2), (4) Date: May 19, 2003

(87) PCT Pub. No.: WO01/83834

PCT Pub. Date: Nov. 8, 2001

(65) Prior Publication Data

US 2003/0185733 A1   Oct. 2, 2003

(30) Foreign Application Priority Data

Apr. 28, 2000 (GB) ................................. 0010241.8

(51) Int. Cl.
*C01G 55/00*   (2006.01)
*C02F 1/72*   (2006.01)

(52) U.S. Cl. ................ 423/592.1; 423/35; 423/22; 423/604; 588/312; 588/320; 588/407; 210/758; 210/912

(58) Field of Classification Search ............. 423/22, 423/35, 592.1, 604; 588/312, 320, 407; 210/758, 210/912

See application file for complete search history.

(56) References Cited

U.S. PATENT DOCUMENTS

| 4,338,199 A | 7/1982 | Modell |
| 4,543,190 A | 9/1985 | Modell |
| 5,461,648 A | 10/1995 | Nauflett et al. |
| 5,560,823 A | 10/1996 | Whiting |
| 6,150,580 A * | 11/2000 | Janikowski ................. 588/316 |
| 6,168,771 B1 * | 1/2001 | Saho et al. .............. 423/245.2 |
| 6,238,632 B1 * | 5/2001 | Kamps ......................... 423/25 |
| 6,485,696 B1 * | 11/2002 | Sato et al. ..................... 423/22 |
| 2004/0241066 A1 * | 12/2004 | Jasra et al. ................... 423/22 |

FOREIGN PATENT DOCUMENTS

JP   10-279726   10/1998

OTHER PUBLICATIONS

Abstract of Japanese Patent No. 2000070899 (Published Mar. 7, 2000).
Abstract of Japanese Patent No. 11138126 (Published May 25, 1999).
Copy of International Search Report dated Jul. 11, 2001 (from International Application No. PCT/GB01/01601.

(Continued)

*Primary Examiner*—Timothy C. Vanoy
(74) *Attorney, Agent, or Firm*—RatnerPrestia

(57) ABSTRACT

A supercritical oxidation process carried out in water is capable of oxidizing "organics" in precious metal organic compositions such as heterogeneous (Pt/C) or homogeneous precious metal catalysts and producing a precious metal oxide with few by-products and low losses of precious metal.

8 Claims, 1 Drawing Sheet

OTHER PUBLICATIONS

Copy of British Search Report dated Nov. 24, 2000 (from British Patent Application No. 0010241.8).

Abstract: W. K. Tolley et al., "Supercritical water treatment of refractory gold ores," Proceed. Gold 90 Symposium, Feb. 26, 1990.

* cited by examiner

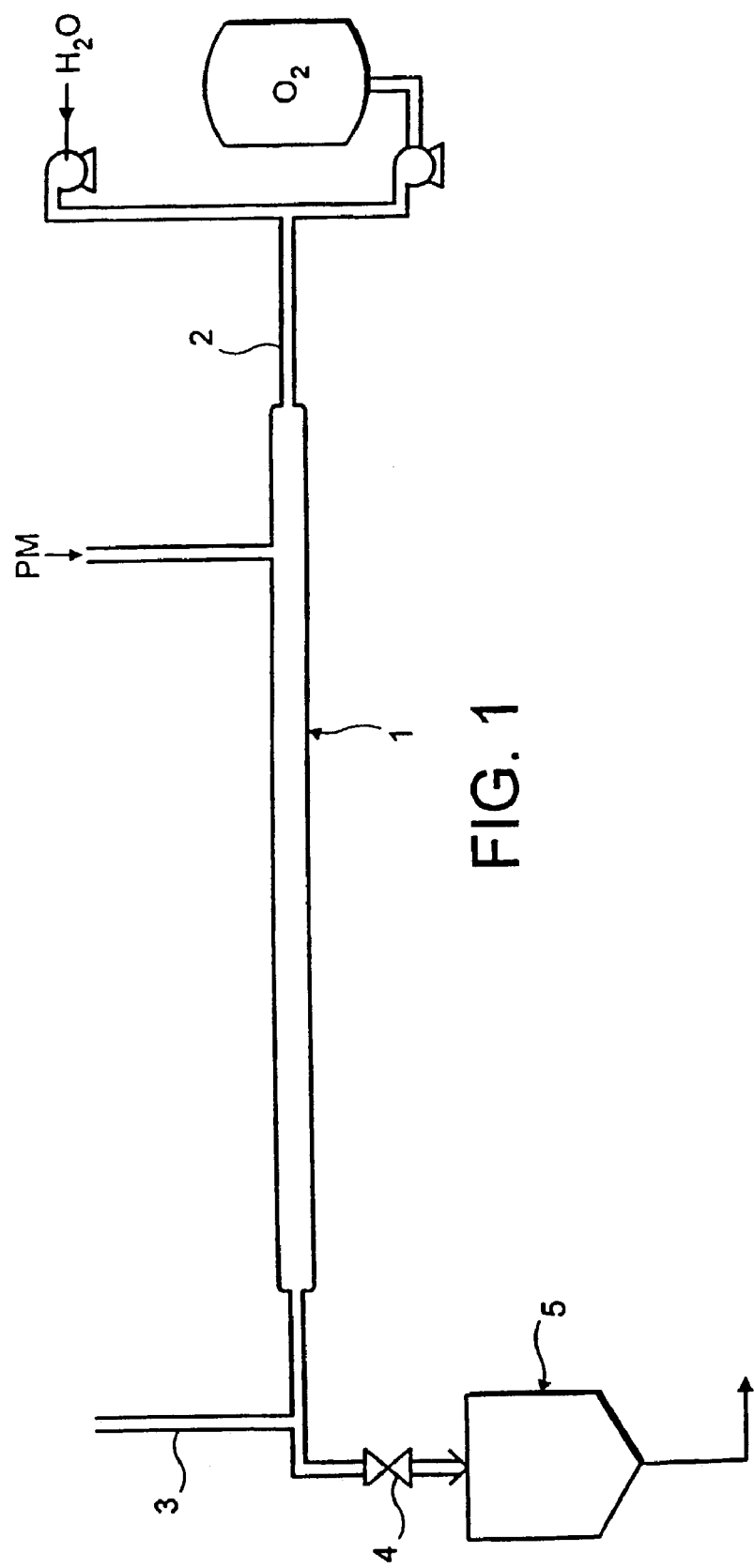

PRECIOUS METAL RECOVERY FROM ORGANICS-PRECIOUS METAL COMPOSITIONS WITH SUPERCRITICAL WATER REACTANT

This application is the U.S. national phase application of PCT International Application No. PCT/GB01/01601.

This invention concerns improvements in precious metals refining, more especially the refining of organic-precious metal compositions.

There are very many organic-precious metal compositions which require refining. These include all sorts of spent catalyst, ranging from heterogeneous catalysts such as a platinum group metal on a carbon support, e.g. 4–5% Pd on carbon, to homogeneous (liquid) catalysts such as those based on rhodium phosphine complexes, refinery and chemical side-streams, waste streams containing precious metals and organic, waste organo-metallic compounds and complexes and many other solids and liquids. The precious metals values contained in such compositions make it important to recover the precious metals. Traditionally, wastes containing precious metals and spent catalysts have been subjected to incineration. However, all such incineration processes lose significant quantities of precious metals, mostly as dusts but also possibly as vapours, and the ashes still contain very considerable quantities of carbon/carbonaceous material, which is difficult to remove. The traditional incineration processes also tend to generate rather larger quantities of pollutants, which can include NOx and dioxins and can generate waste water streams that are difficult to treat.

It is known that organic materials may be oxidised in supercritical water (see U.S. Pat. No. 4,338,199 for example) but we do not believe that there has been any proposal to treat organic materials containing precious metals. We are aware of one academic proposal to treat phenol as a waste material by supercritical water oxidation in the presence of $MnO_2$ catalyst. This proposal did not suggest the presence or use of a precious metal catalyst, and the very high cost of such materials would be a disincentive. We have now discovered that a process according to the present invention can be carried out in a manner that is safe, environmentally friendly, energy efficient and yields precious metal products in suitable form for further processing.

The organic-precious metal compositions, used as this term is used herein, used as feedstock for the process of the present invention may be any precious metal complex, compound or physical mixture (such terminology is intended to include precious metals per se or precious metal compounds or complexes supported on an "organic" support, such as active carbon, although carbon as such is not, strictly speaking, organic). The compositions include mixtures of precious metals or compounds or complexes with organic materials that would otherwise be considered as wastes. That is, organic wastes may be admixed with a proportion of precious metal or precious metal composition and treated according to the present invention, thereby oxidising the organic waste and recovering the precious metal for further refining or other treatment or for recycling in the treatment of more waste organic.

The present invention provides a process for the refining of organic-precious metal compositions, comprising treating such composition in a reaction fluid comprising supercritical water and a source of oxygen, permitting the organic components of the composition to be oxidised and recovering a precious metal oxide product from the reaction products.

The supply of oxygen is conveniently done at the inlet of an elongate tube reactor, at the same time as as water is supplied to the reactor, although oxygen may alternatively or additionally be supplied downstream of the reactor inlet, and supplementary oxygen maybe supplied at one or more points along the length of the reactor. For example, supplementary oxygen may be fed into the reactor downstream of an organic feedstock injection point.

The order of adding components to the reaction fluid is not especially important. The process of the invention can be operated by pre-mixing the organic-precious metal composition and water, heating the resulting mixture to supercritical temperature, or close to that temperature, and adding oxidant (the heat of reaction is sufficient to raise the temperature to or higher than the critical temperature). The oxidant may also be pre-mixed with one or more of the reaction mixture components.

Although it is preferred to operate a continuous process, it may be operated as a batch process.

The quantity of oxygen used is such to achieve complete oxidation of feedstock under the reaction conditions, and is suitably adjusted by feedback from sensors at the reactor outlet which show free oxygen and the presence of any carbon monoxide. Desirably, the quantity is such that all carbon is oxidised to carbon dioxide. The oxygen is suitably supplied from a tank of liquid oxygen. It is possible to use a mixture of oxygen with one or more inert gases, but at present this is preferably not used.

Although it is presently preferred to use oxygen as the oxidant, other sources of oxygen may be considered, including air, hydrogen peroxide and nitric acid.

In general, water desirably forms 90% by wt or more, for example 95% by wt or more, of the entire reaction mixture.

The supercritical point of water is 374° C. and 221 bar. Any supercritical reactor must be engineered to withstand temperature and pressures well in excess of the supercritical point. Although the material cost of plant to carry out the process, including special high pressure pump and valves, is intrinsically high, the fact that the process is simple and quick, combined with low operating costs and low losses of material, makes the process economical.

The process is suitably carried out at temperature in the range from 400 to 600° C., preferably 500 to 580° C., and suitably at a pressure from about 230 bar to about 300 bar, preferably at a pressure of 250 bar to 300 bar. There is, of course, a pressure drop across the length of the reactor, dependent upon the individual reactor design. The starting temperature may, as already mentioned, be below 374° C.

The oxidation of organics according to the invention is exothermic; a temperature rise of 150° C. or so in the reactor has been observed 2 seconds after the injection of the feedstock, as the reactor itself operates in adiabatic mode. The reactor is preferably an elongate tube reactor, and is desirably insulated. The reactor may suitably be in the form of a coiled tube reactor. By using conventional heat exchangers/economisers to manage heat in the various inlet and/or outlet streams it is normally possible to make the whole process operate in autothermal mode, i.e. without the addition of supplementary fuel. Indeed, a part of the heat generated in the process can be-used to produce, for instance, high pressure steam that can be used elsewhere on a manufacturing site.

The output of the process of the invention is finely divided precious metal oxide in a supercritical aqueous slurry or solution (before pressure let-down) which also contains the other by-products of the oxidation reaction, dependent upon the actual chemical composition of the feedstock organic composition. Thus, if the organic component is carbon or hydrocarbon-based, without hetero-atoms, the products are water and carbon dioxide, which creates a carbonic acid solution after pressure let-down. If there are phosphorus, sulphur or nitrogen atoms present in the feedstock, the product contains phosphoric acid, sulphuric acid or nitrogen, respectively. It is extremely significant that under the reaction conditions, there is no generation of $NO_x$, which is a huge advantage over conventional pyrolysis-type processing. If desired, quench water may be added to the reaction product, and either at that point, or subsequently, it may be desirable to neutralise the acid formed by the addition of an alkali such as sodium hydroxide. Generally, however, we prefer not to do so because of the possibility of forming insoluble salts, which may cause blockages in the supercritical state, or the contamination of the precious metal oxide product which may complicate further processing thereof.

The precious metal component of the feedstock composition may be the only metal present, or other metals may be present either as components, e.g. as promoters of a catalyst, or as contaminants, e.g. contaminents picked up during use. In the latter case, the product of the process of the invention will include the highest oxidation states of such metals. The precious metal oxide may be separated from such contaminent metal oxides by conventional processing that forms no part of this invention.

BRIEF DESCRIPTION OF THE DRAWING

FIG. 1 illustrates one embodiment of a plant for carrying out the invention.

The invention will be further described with reference to the accompanying schematic drawing one embodiment of a plant to carry out the invention. Referring to the drawing, an elongate tube reactor, e.g. several hundred metres long and in the form of a coil, is generally indicated by 1. Into the reactor is fed either two streams or a combined stream, 2, of water and oxygen, pumped at a pressure in excess of the critical pressure, e.g. at about 260 bar. The quantity of oxygen is preferably adjusted by a feedback from an oxygen sensor (not shown) at the reactor outlet for example, to achieve 10% or more $O_2$ by vol in the outlet gas in a pilot plant. A full scale plant may suitably be operated with a lower excess of $O_2$. The water is fed at a rate to ensure that there is a high speed through the reactor to ensure that there is no settling of solids. The organic-precious metal feedstock is fed, in the particular pilot plant design, about ¼ of the way along the tube reactor, at which point the water is clearly supercritical. The feedstock itself is added at a suitable rate to give an adiabatic temperature rise. The feedstock may be a liquid organic-precious metal composition, in which case it is pumped directly into the reactor, or may be solid, in which case it is slurried in water before being pumped into the reactor. The output from the reactor may be diluted and/or neutralised with a quench water stream shown by, 3, although this is optional, before passing through suitable pressure let down equipment, 4, (shown as a valve) before passing into a gas/liquid separation tank, 5. Excess gases, e.g. $O_2$, $N_2$, $CO_2$ etc are taken off through line, 6, and a slurry of precious metal oxide is taken through line, 7, at the base of the separation tank. The precious metal oxide tends to be in very finely divided form if the feedstock is liquid, and in particles corresponding to the form of the feedstock metal if solid, e.g. if a Pd on carbon catalyst. The solids may then be separated and subjected to such further treatment or refining as is necessary or desirable.

In order to economise on water usage, it is preferred to recycle water. Similarly, good engineering design provides heat exchange between streams.

It should be understood that the drawing and the above specific description, relates to a "direct injection" mode of operation. The skilled person will understand that the invention may be operated in a number of ways differing in detail. For example, and especially for solid feedstocks such as Pd/C or Pt/C, the feedstock may desirably be slurried in water, fed via a heat exchanger to the reactor and then oxygen is injected to carry out the oxidation reactions.

The invention will now be described by way of working examples.

EXAMPLE 1

80 Kg of spent Pt on carbon catalyst was slurried with 720 Kg of water, passed through a grinder pump to reduce particle size and fed to a supercritical water oxidiser reactor at a rate of 250 Kg/hr. The fresh catalyst was 5 wt % Pt on carbon, but the spent catalyst was assayed at 1.6 wt % Pt on carbon. Oxygen was fed to the reactor at a rate adjusted to yield 15% $O_2$ in the output gas. The output slurry was filtered to yield a fine, black Pt oxide and a clear, light yellow filtrate. The filtrate contained less than 0.5 ppm Pt.

EXAMPLE 2

The process of Example 1 was used to treat an unused 5 wt % Pd/carbon catalyst doped with toluene. The filtrate contained less than 0.01 ppm Pd. Typically, a spent catalyst contains 0.8 wt % Pd on carbon, and can also be treated according to the invention.

EXAMPLE 3

The process of Example 1 was adapted to feed a rhodium phosphine liquid organic catalyst stream, containing 0.973% Rh by weight directly onto the reactor. The product liquor was a slurry of very fine black particles in a colourless solution.

In all the above Examples, the recovery of precious metal and destruction of organic was well in excess of 95% by wt. The process may be expected to yield even better results upon optimisation.

What is claimed is:

1. A process for refining an organic-precious metal composition, comprising treating the composition in a reaction fluid comprising supercritical water and a source of oxygen to form a supercritical aqueous slurry comprising a precious metal oxide in solid form and permit at least the organic components of the composition to be oxidised and recovering the precious metal oxide while still in solid form from the reaction products.

2. A process according to claim 1, wherein the organic-precious metal composition comprises one or more of the platinum group metals.

3. A process according to claim 1, wherein the source of oxygen is oxygen.

4. A process according to claim 3, wherein the oxygen is supplied from liquid oxygen.

5. A process according to claim 1, carried out at a temperature of from 400 to 600° C.

6. A process according to claim 1, carried out in a continuous elongated reactor.

7. A process according to claim 6, wherein organic-precious metal composition is admixed with water to form a mixture and fed to the reactor, and oxygen is subsequently added.

8. A process according to claim 7, wherein the mixture is fed at a temperature below the critical temperature of water into the reactor, and the exotherm from the oxidation provides supercritical temperatures.

* * * * *